United States Patent
Tiwari et al.

(10) Patent No.: US 11,695,618 B2
(45) Date of Patent: Jul. 4, 2023

(54) QUANTUM COMPUTING IN ROOT CAUSE ANALYSIS OF 5G AND SUBSEQUENT GENERATIONS OF COMMUNICATION NETWORKS

(71) Applicant: Accenture Global Solutions Limited, Dublin (IE)

(72) Inventors: Sanjay Tiwari, Karnataka (IN); Gaurav Khanduri, Sydney (AU); Mayur Kolhe, Bengaluru (IN); Carl Matthew Dukatz, Troy, MI (US); Kung-Chuan Hsu, Cerritos, CA (US); Shantha Maheswari, Kundalahalli/Bangalore (IN); Mathangi Sandilya, Bangalore (IN); Anshul Kapoor, Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 65 days.

(21) Appl. No.: 17/143,644

(22) Filed: Jan. 7, 2021

(65) Prior Publication Data

US 2022/0224590 A1    Jul. 14, 2022

(51) Int. Cl.
*H04L 41/0631* (2022.01)
*G06N 10/00* (2022.01)
(Continued)

(52) U.S. Cl.
CPC ......... *H04L 41/0631* (2013.01); *G06N 10/00* (2019.01); *H04L 41/12* (2013.01); *H04L 41/16* (2013.01); *H04L 43/06* (2013.01)

(58) Field of Classification Search
CPC ..... H04L 41/0631; H04L 41/12; H04L 41/16; H04L 43/06; G06N 10/00
See application file for complete search history.

(56) References Cited

U.S. PATENT DOCUMENTS 9,148,809 B2 * 9/2015 Rahman ............... H04W 24/08
10,938,634 B1 * 3/2021 Cruise ................. H04L 41/0686
(Continued)

FOREIGN PATENT DOCUMENTS

EP           2795841         10/2014
WO      WO 2019/104196      5/2019

OTHER PUBLICATIONS

EP Extended Search Report in European Appln No. 22150459.0, dated May 9, 2022, 14 pages.
(Continued)

*Primary Examiner* — Thu V Nguyen
*Assistant Examiner* — Aye M Aung
(74) *Attorney, Agent, or Firm* — Fish & Richardson P.C.

(57) ABSTRACT

Methods, systems, and apparatus for root cause analysis in a communication network. In one aspect, a method includes providing a quantum computer with data representing a topology of the communication network, the topology comprising a graph of vertices representing network devices and edges representing connections between network devices; receiving, from the quantum computer, data representing a first subset of network devices, wherein the first subset comprises a dominating set of vertices or a vertex cover for the graph; monitoring network devices in the first subset to generate alarm data representing triggered network device alarms; providing the alarm data to a quantum computer; receiving, from the quantum computer, data representing a second subset of network devices, wherein the second subset comprises a set cover for the alarm data and the network devices in the second subset comprise diagnosed sources of failures in the communication network.

20 Claims, 9 Drawing Sheets

(51) Int. Cl.
    *H04L 41/12*       (2022.01)
    *H04L 41/16*       (2022.01)
    *H04L 43/06*       (2022.01)

(56) References Cited

U.S. PATENT DOCUMENTS

| | | | |
|---|---|---|---|
| 11,237,807 B1* | 2/2022 | Rao | G06F 8/443 |
| 2007/0063837 A1* | 3/2007 | McKenna | G08B 25/003 |
| | | | 340/540 |
| 2016/0218911 A1 | 7/2016 | Wessels et al. | |
| 2017/0286852 A1* | 10/2017 | Rezaie | G06N 5/048 |
| 2019/0361759 A1* | 11/2019 | Haugen | H04L 41/0677 |
| 2020/0210094 A1* | 7/2020 | Podluzhny | G06F 3/0689 |
| 2021/0303632 A1* | 9/2021 | Parthasarathy | G06F 16/9035 |
| 2021/0334690 A1* | 10/2021 | Huang | G06F 18/2323 |
| 2021/0373063 A1* | 12/2021 | Gundel | G06N 20/00 |
| 2021/0374550 A1* | 12/2021 | Cao | G06F 17/16 |

OTHER PUBLICATIONS

Feld et al., "Quantum Technology and Optimization Problems," Proceedings of the First International Workshop, QTOP 2019, Munich, Germany, Mar. 18, 2019, 234 pages.
Tee et al., "Vertex Entropy As a Critical Node Measure in Network Monitoring," IEEE Transactions on Network and Service Management, Sep. 7, 2017, 14(3):646-660.
Sole et al., "Survey on Models and Techniques for Root-Cause Analysis," arXiv, Jul. 3, 2017, arXiv:1701.08546v2, 18 pages.
You et al., "AI for 5G: Research Directions and Paradigms," arXiv, Jul. 23, 2018, arXiv:1807.08671v1, 12 pages \* cited by examiner

QUANTUM COMPUTING IN ROOT CAUSE ANALYSIS OF 5G AND SUBSEQUENT GENERATIONS OF COMMUNICATION NETWORKS

TECHNICAL FIELD

The present invention relates to quantum computing and telecommunications.

BACKGROUND

In telecommunications, 5G is the fifth generation technology standard for broadband cellular networks. In 5G networks, the service area is divided into small geographical areas called cells. All 5G wireless devices in a cell are connected to the Internet and telephone network by radio waves through a local antenna in the cell. 5G networks will have greater bandwidth, giving higher download speeds. To achieve this greater bandwidth and higher download speeds, 5G networks are expected to hugely increase network densification. For example, ultra-dense deployment of small cells or Dense Nets (with a few tens of meters inter-site distance) are expected to be one of the main approaches used to reach coverage and throughput requirements.

Root cause analysis (RCA) is a method for identifying root causes of causal chains of events that lead to faults or problems. RCA is a common and recurring task performed by operators of cellular networks. RCA enables a provider to maintain a quality of offered services and minimize or even eliminate root causes of faults in cellular networks.

SUMMARY

This specification describes methods and systems for root cause analysis in communication networks using quantum computing.

In general, one innovative aspect of the subject matter described in this specification can be implemented in a method for root cause analysis in a communication network, the method comprising: providing a quantum computing resource with input data comprising data representing a topology of the communication network, the topology comprising a graph of vertices representing network devices and edges representing connections between network devices; receiving, from the quantum computing resource, data representing a first subset of network devices in the communication network, wherein the first subset comprises i) a dominating set of vertices for the graph or ii) a vertex cover for the graph; monitoring network devices in the first subset to generate alarm data representing triggered network device alarms; providing the alarm data to a quantum computing resource; receiving, from the quantum computing resource, data representing a second subset of network devices in the communication network, wherein i) the second subset comprises a set cover for the alarm data and ii) the network devices in the second subset comprise diagnosed sources of failures in the communication network.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the dominating set comprises a minimum dominating set.

In some implementations the vertex cover comprises a minimum vertex cover.

In some implementations the set cover comprises a minimum set cover.

In some implementations the input data is based on a local failure-alarm model, wherein the local failure-alarm model assumes that a failure on a network device triggers an alarm on the network device and alarms on neighboring network devices.

In some implementations a respective alarm is fitted at each network device in the communication network.

In some implementations the method includes generating the input data, the input data comprising a quadratic unconstrained binary optimization (QUBO) formulation of the task of determining i) a dominating set of vertices for the graph or ii) a vertex cover for the graph.

In some implementations the QUBO formulation of the task of determining a minimum dominating set of vertices for the graph is given by $$\min_{x_i \in \{0,1\}} \sum_{i=0}^{N-1} x_i + P \sum_{i=0}^{N-1} \left(1 - x_i - \sum_{j \in \mathcal{N}_i} x_j + \sum_{k=0}^{\lceil \log_2 |\mathcal{N}_i| \rceil} b_{i,k} 2^k \right)^2$$

where N represents the number of vertices in the graph, $\mathcal{N}_i$ represents a set of vertices adjacent to vertex i, P represents a penalty constant, $x_i$ represent binary variables that take the value 1 if vertex i is in the minimum dominating set and take the value 0 otherwise, and $b_{i,k}$ represent binary variables.

In some implementations the QUBO formulation of the task of determining a minimum vertex cover for the graph is given by $$\min_{x_i, b_{i,j} \in \{0,1\}} \sum_{i=0}^{N-1} x_i + P \sum_{\{i,j\} \in E} (x_i + x_j - b_{i,j} - 1)^2$$

where N represents the number of vertices in the graph, E represents the set of edges in the graph, P represents a penalty constant, $x_i$ represent binary variables that the value 1 if vertex i is in the minimum dominating set and take the value 0 otherwise, and $b_{i,j}$ represents binary variables.

In some implementations the alarm data comprises multiple sets of alarm data, each set of alarm data comprising data identifying i) a network device in the first subset and ii) neighboring network devices in the communication network.

In some implementations monitoring network devices in the first subset to generate alarm data representing triggered network device alarms comprises: monitoring the network devices in the first subset to identify one or more network devices in the first subset with triggered alarms; for each network device in the first subset with a triggered alarm: identifying, based on the topology of the communication network, neighboring network devices of the network device; and generating a set of alarm data for the network device, wherein the set of alarm data comprises data identifying the network device and the neighboring network devices.

In some implementations the neighboring network devices of the network device comprise network devices included in the first subset or included in the complement of the first subset.

In some implementations the data instructing the quantum computing resource to determine a minimum set cover for the alarm data comprises a QUBO formulation of the task of determining a minimum set cover for the alarm data, wherein the QUBO formulation is given by $$\min_{x_i \in \{0,1\}} \sum_{i=0}^{N-1} x_i + P \sum_{u=0}^{n-1} \left(1 - \sum_{j:u \in V_j} x_j + \sum_{k=0}^{\lceil \log_2 N \rceil - 1} b_{u,k} 2^k \right)^2$$

where N represents the number of sets of alarm data, $V_j$ represents the j-th set of alarm data, P represents a penalty constant, $x_i$ represent binary variables that the value 1 if the set $V_i$ is in the minimum set cover and take the value 0 otherwise, and $b_{u,k}$ represent binary variables.

The method of claim 1, wherein the method further comprises processing, by the quantum computing resource, the input data to compute i) the dominating set of vertices for the graph or ii) the vertex cover for the graph.

In some implementations the method further comprises processing, by the quantum computing resource, the alarm data to compute the set cover of triggered alarms on network devices in the first subset of network devices.

In some implementations the communication network comprises a 5G network.

In some implementations the method further comprises investigating the network devices in the second subset to identify root causes of failures in the communication network.

In some implementations the method further comprises determining one or more corrective actions based on identified root causes of failures in the communication network.

In some implementations the quantum computing resource comprises a quantum annealer.

In general, another innovative aspect of the subject matter described in this specification can be implemented in a method for root cause analysis in a communication network, the method comprising providing a quantum computing resource with input data comprising data representing a topology of the communication network, the topology comprising a graph of vertices representing network devices and edges representing connections between network devices; receiving, from the quantum computing resource, data representing a first subset of network devices in the communication network, wherein the first subset comprises i) a dominating set of vertices for the graph or ii) a vertex cover for the graph; monitoring network devices in the first subset to generate alarm data representing triggered network device alarms; and determining, based on the alarm data, root-cause failures in the communication network.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

In general, another innovative aspect of the subject matter described in this specification can be implemented in a method for root cause analysis in a communication network, the method comprising monitoring network devices in the communication network to generate alarm data representing triggered network device alarms; providing the alarm data to a quantum computing resource; and receiving, from the quantum computing resource, data representing a subset of network devices in the communication network, wherein i) the subset comprises a set cover for the alarm data and ii) the network devices in the subset comprise diagnosed sources of failures in the communication network.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular ways so as to realize one or more of the following advantages.

A system implementing the presently described techniques can provide real time analysis of root cause failures in a network and achieve faster fault identification, reduced fault resolution time and improved operational efficiency and stability of the network.

In addition, the real time analysis of root cause failures does not require that each network device is monitored—instead only a subset of network devices needs to be monitored. Accordingly, the computational resources associated with network device monitoring and the logging and processing of alarm data is reduced.

In addition, the presently described techniques are scalable and can be applied to large, dynamic and multi-dimensional networks, e.g., 5G networks with billions of devices such as large-scale Internet of Things and Machine to Machine communications In addition, a system implementing the presently described techniques can identify root causes of failures in a network without using historical data.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for root cause analysis in a complex and dynamic communication network, e.g., a 5G network.

A first technique includes determining a subset of network devices for root cause analysis. Under the assumption that an alarm is located at each network device, a quantum computing resource computes a representative subset of network devices by solving for a minimum dominating set or minimum vertex cover of a graph representing the communication network. This subset of network devices is smaller than the complete set of network devices, however, by construction, monitoring the subset of network devices produces information which, when used for root cause analysis, produces accurate and complete results.

A second technique includes performing root cause analysis on alarm data generated by monitoring all or a subset of network devices. The alarm data includes a collection of sets of data, where each set includes data identifying a failing network device and alarms that monitor the failing network device. A quantum computing resource solves for a minimum set cover of the alarm data. The minimum set cover represents a minimum set of root cause devices that triggered the observed alarms. The first and second techniques can be combined or implemented separately.

Example Hardware

Figure 1:
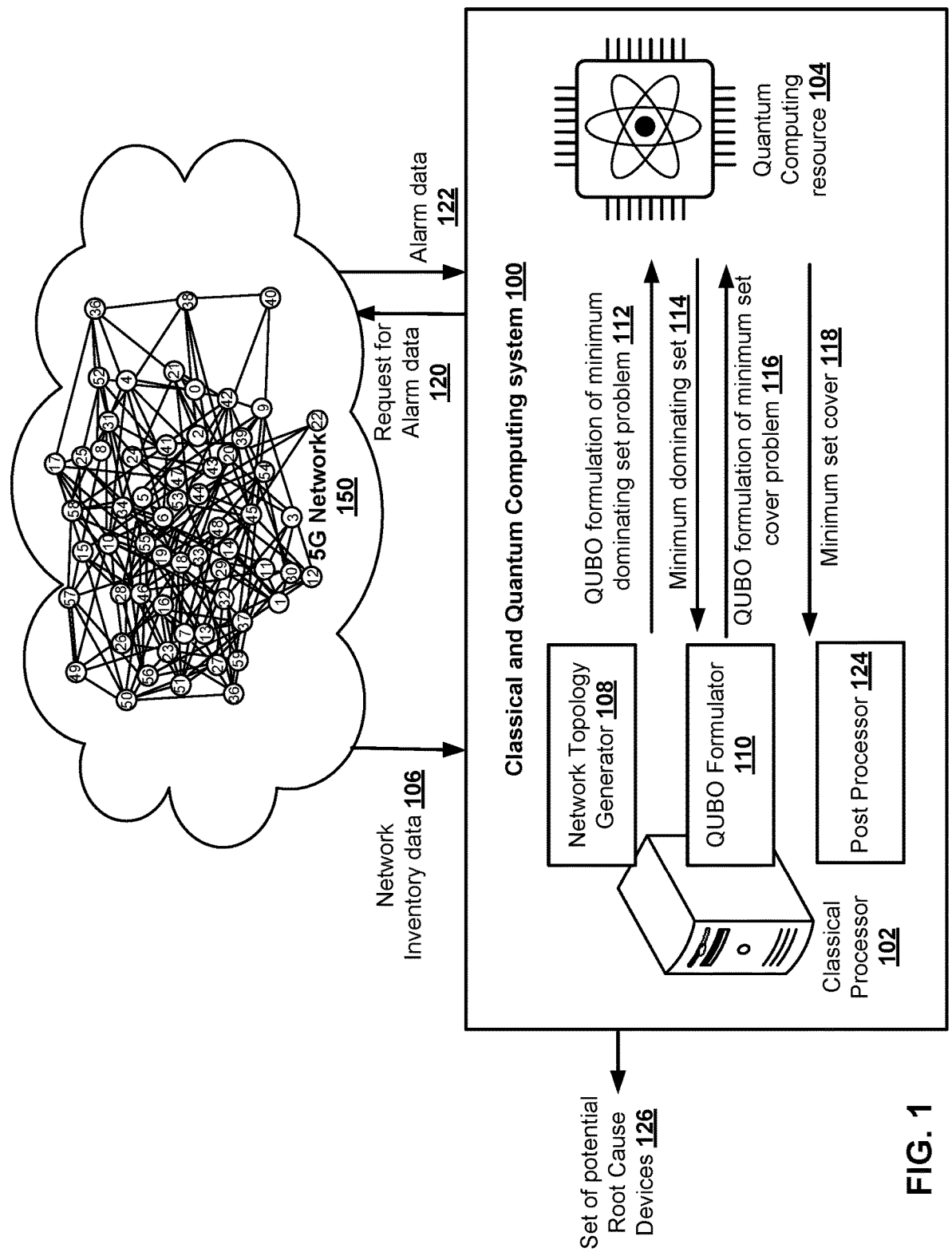
FIG. 1 shows an example classical-quantum computing system for root cause analysis of communication networks.

FIG. 1 shows a conceptual block diagram of an example classical-quantum computing system 100 for root cause analysis of communication networks. The example system 100 includes a classical processor 102 and quantum computing device 104. The classical processor 102 and quantum computing device 104 can exchange electronic communications over one or more networks, or can exchange communications in another way, such as over one or more wired or wireless connections.

The classical processor 102 is configured to perform classical computations. Generally, the classical computing components included in example system 100 can be implemented as one or more classical computers having physical hardware like that described with respect to FIG. 9.

The quantum computing device 104 is configured to perform quantum computations. For convenience, the classical processor 102 and quantum computing device 104 are illustrated as separate entities. However, in some implementations the classical processor 102 can be included in the quantum computing device 104. That is, the quantum computing device 104 can include components for performing classical computing operations. In addition, in some implementations the quantum computing device 104 may be a remote system, e.g., external to the system 100, that is in data communication with the classical processor 102.

The system 100 is configured to receive network inventory data 106 as input. The network inventory data 106 includes a list of network devices, e.g., computers, routers, servers, included in a communication network, e.g., 5G network 150. The network inventory data 106 can further include properties of the network devices in the communication network, e.g., device locations, device connections, a list of alarms that monitor the devices. In some implementations an alarm can be located at each network device.

The classical processor 102 includes a network topology generation module 108, a quadratic unconstrained binary optimization (QUBO) formulation module 110, and a post processing module 124. The network topology generation module 108 is configured to process the received network inventory data 106 to create a network topology for the communication network. Example operations performed by the network topology generation module 108 are described below with reference to FIG. 2.

The QUBO formulation module 110 is configured to determine QUBO formulations of computational tasks to be solved, e.g., a QUBO formulation 112 of the task of determining a dominating set, e.g., minimum dominating set, of vertices for a graph included in a network topology created by the network topology generation module 108, a QUBO formulation of the task of determining a vertex cover, e.g., minimum vertex cover, for a graph included in a network topology created by the network topology generation module 108, or a QUBO formulation 116 of the task of determining a set cover, e.g., minimum set cover, for alarm data 120 received from alarms located at network devices in the 5G network 150. Example operations performed by the QUBO formulation module 110 are described below with reference to FIG. 2.

The classical processor 102 is configured to transmit QUBO formulations of computational tasks to be solved to the quantum computing device 104.

In some implementations the quantum computing device 104 can be a quantum annealer. A quantum annealer is a device configured to perform quantum annealing—a procedure for finding the global minimum of a given objective function over a given set of candidate states using quantum tunneling. Quantum tunneling is a quantum mechanical phenomenon where a quantum mechanical system overcomes localized barriers in the energy landscape which cannot be overcome by a classically described system. Some quantum annealer devices perform a subclass of quantum annealing called adiabatic quantum computing, which relies on the adiabatic theorem to perform computations.

Quantum annealer devices can solve problems if they are formulated in an acceptable format. For example, quantum annealer devices can solve some QUBO formulations of problems by mapping the QUBO formulation into a qubit network of a quantum annealer device.

In other implementations the quantum computing device 104 can be a quantum gate processor. A quantum gate processor includes one or more quantum circuits, i.e., models for quantum computation in which a computation is performed using a sequence of quantum logic gates, operating on a number of qubits (quantum bits).

Quantum gate processors can be used to solve certain optimization problems, e.g., problems that can be formulated as a QUBO problem. For example, some quantum gate processors can solve QUBO problems by simulating a corresponding adiabatic quantum annealing process using a gate model. This can be advantageous, e.g., compared to performing directly the corresponding adiabatic quantum annealing process using a quantum annealer device, since not all quantum annealer devices can realize physical quantum systems that represent an optimization problem. For example, some quantum annealer devices may not provide the physical interactions necessary to solve an optimization problem. In these examples, a Hamiltonian describing the optimization problem can be decomposed into a sequence of single or multi-qubit quantum gates, and a solution to the optimization problem can be obtained through application of the sequence of single or multi-qubit gates on a register of qubits and subsequent measurement of the register of qubits.

The quantum computing device 104 is configured to perform the computational tasks specified by the QUBO formulations received from the classical processor 102 and to return data representing solutions to the computational tasks, e.g., data 114 representing a minimum dominating set of a graph or data 118 representing a minimum set cover for alarm data. Example operations performed by the quantum computing device 104 are described below with reference to FIG. 2.

The post processing module 124 is configured to process data received from the quantum computing device 104. For example, the post processing module 124 can use data representing a minimum dominating set 114 or minimum vertex cover received from the quantum computing device 104 to determine a subset of network devices in the 5G network 150 that corresponds to the minimum dominating set or minimum vertex cover. The post processing module 124 can then cause the network devices in this subset to be monitored by requesting alarm data 120 from the network devices in the subset. As another example, the post processing module 124 can use data representing a minimum set cover 118 corresponding to alarm data 122 to determine a set of potential root cause devices 126 in the 5G network 150. Example operations performed by the post processing module 124 are described below with reference to FIG. 2.

The classical processor 102 can provide the set of potential root cause devices 126 as output. For example, the classical processor 102 can provide the set of potential root cause devices 126 to, or can include, a broker that initiates actions based on the output data. For example, the broker can initiate an investigation of the potential root cause devices and determine corrective actions if faults or problems are found.

Programming the Hardware

Figure 2:
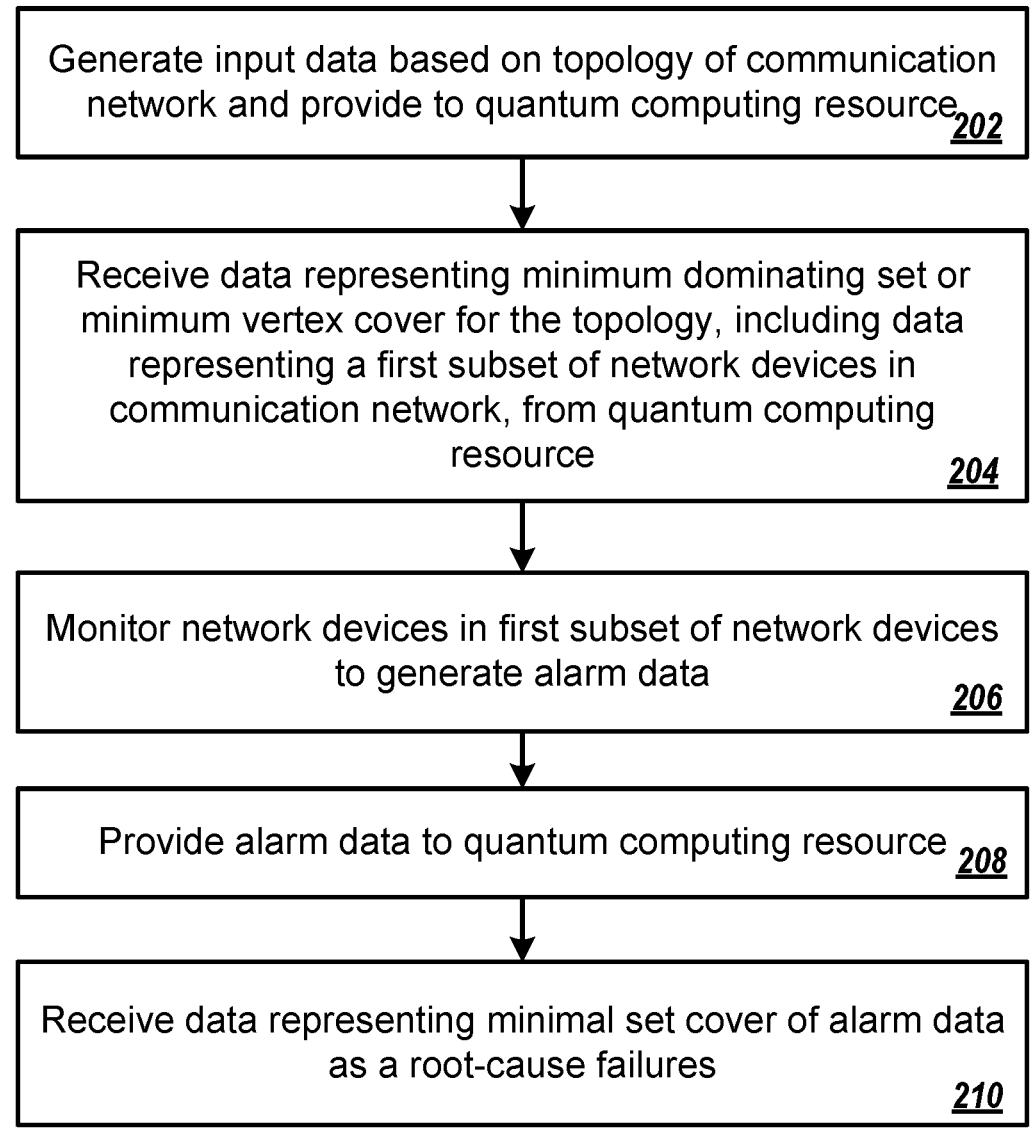
FIGS. 2-4 are flowcharts of example processes for root cause analysis in a communication network.

FIG. 2 is a flowchart of a first example process 200 for root cause analysis in a communication network that includes multiple network devices. For convenience, the process 200 will be described as being performed by a system of one or more classical and/or quantum computers located in one or more locations. For example, example system 100 of FIG. 1, appropriately programmed in accordance with this specification, can perform the process 200.

The system provides a quantum computing resource with input data requesting determination of a subset of network devices in the communication network to be monitored (step 202), e.g., for failure detection. The input data includes (e.g., is generated by the system based on) data representing a topology of the communication network. The topology includes a graph G=(V, E) of vertices V and edges E, where the vertices represent network devices and the edges represent respective connections between network devices. The network topology can provide a physical or logical description of how network devices and communication paths are set up to relate to each other. For example, a physical network topology describes physical connections and interconnections between network devices, e.g., based on physical wires, cables, etc. A logical network topology provides a conceptual understanding of how and why the network is arranged the way it is, and how data moves through it. An example communication network topology is illustrated and described below with reference to FIG. 5.

The system can generate the input data based on a local failure-alarm model for the communication network. The local failure-alarm model represents the propagation of triggered alarms in the communication network. More specifically, under the local failure-alarm model, it is assumed that a failure on one network device triggers an alarm on the network device itself and on at least one other network device within a local neighborhood of the network device, e.g., on other network devices directly connected to the network device or within a predetermined number of connections from the network device.

Under the local failure-alarm model, in order to observe a failure event in the communication network, each network device alarm does not need to be monitored. Instead, a smaller number of network device alarms can be monitored. To determine a smaller or smallest set of network devices to monitor such that any failure in the communication network is detected, the system can generate input data that instructs the quantum computing resource to determine either a dominating set, e.g., a minimum dominating set, of vertices for the graph included in the network topology or a vertex cover, e.g., a minimum vertex cover, for the graph included in the network topology, e.g., by generating a formulation of either task based on the data representing the topology of the communication network and in a format that is accepted by the quantum computing resource. Both the task of determining a minimum dominating set for a graph and the task of determining a minimum vertex cover of a graph are NP-Hard problems, which no known classical algorithms can solve efficiently asymptotically.

For example, in some implementations the quantum computing resource may include a quantum computing resource, e.g., an annealer, that is configured to solve quadratic unconstrained binary optimization (QUBO) problems. Therefore, to instruct the quantum computing resource to determine a minimum dominating set of vertices for the graph included in the network topology or a minimum vertex cover for the graph included in the network topology, the system can generate a QUBO formulation of the task of determining a minimum dominating set of vertices for the graph or a minimum vertex cover for the graph based on the data representing the topology of the communication network. The system can then provide the quantum computing resource with input data representing the generated QUBO formulation.

In a QUBO problem, variables take binary values and the objective function is at most a quadratic (second-order) polynomial. Problem constraints are mapped to penalty terms which are added to the QUBO objective function. In cases where the problem constraints include equality constraints, each equality constraint can be included in the QUBO objective function by expressing the constraint as an equation equal to zero, squaring the equation, multiplying the squared equation by a penalty constant and adding it to the QUBO objective function. In cases where the problem constraints include inequality constraints, each inequality constraint can be mapped to a respective equality constraint through the use of slack variables.

For example, let $M \in \mathbb{N}$ and assume an integer variable y takes values in the range $$0 \leq y \leq M. \tag{1}$$

Let $a_i \in \{0, 1\}$ for $i=0, 1, \ldots, \lceil\log_2(M+1)\rceil-1$ be binary variables such that $$y = \sum_{i=0}^{\lceil \log_2(M+1) \rceil - 1} a_i 2^i \quad (2)$$

in which the $a_i$ form a binary representation of y. The expression for y given by Equation (2) automatically satisfies the inequality $0 \le y$ in Equation (1). If $M=2^k-1$ for some $k \in \mathbb{N}$, then the inequality $y \le M$ in Equation (1) also holds, and the inequality of Equation (1) has been accurately mapped to the equality of Equation (2). However, in general $M \ne 2^k-1$ for any $k \in \mathbb{N}$ and therefore the RHS of Equation (2) can take values larger than M. In this case, to enforce the inequality $$\sum_{i=0}^{\lceil \log_2(M+1) \rceil - 1} a_i 2^i \le M \quad (3)$$

another set of binary slack variables of the same size $b_i \in \{0, 1\}$ for $i=0, 1, \ldots, \lceil\log_2(M+1)\rceil-1$ can be introduced to enforce the equality constraint $$\sum_{i=0}^{\lceil \log_2(M+1) \rceil - 1} a_i 2^i + \sum_{i=0}^{\lceil \log_2(M+1) \rceil - 1} b_i 2^i \le M \quad (4)$$

Since $0 \le \sum_{i=0}^{\lceil \log_2(M+1) \rceil - 1} b_i 2^i \le 2^{\lceil \log_2(M+1) \rceil} - 1$, it hold that $\sum_{i=0}^{\lceil \log_2(M+1) \rceil - 1} a_i 2^i = M - \sum_{i=0}^{\lceil \log_2(M+1) \rceil - 1} b_i 2^i \le M$ and $\sum_{i=0}^{\lceil \log_2(M+1) \rceil - 1} a_i 2^i = M - \sum_{i=0}^{\lceil \log_2(M+1) \rceil - 1} b_i 2^i \ge M - (2^{\lceil \log_2(M+1) \rceil} - 1)$ in which $M - (2^{\lceil \log_2(M+1) \rceil} - 1) \le 0$. Therefore, by introducing the two sets of slack binary variables $a_i$ and $b_i$, the inequality constraint given in Equation (1) is satisfied, i.e., $$0 \le y = \sum_{i=0}^{\lceil \log_2(M+1) \rceil - 1} a_i 2^i \le M. \quad (5)$$

To summarize, the slack binary variables $a_i$ are introduced to handle the $\ge 0$ inequality, the slack binary variables $b_i$ are introduced to handle the $\le M$ inequality, and if $M=2^k-1$ for some $k \in \mathbb{N}$ the binary variables $b_i$ do not need to be introduced.

Techniques for generating a QUBO formulation of the task of determining a minimum dominating set of vertices for a graph or the task of determining a minimum vertex cover for a graph are described below.

Minimum Dominating Set

The task of determining a minimum dominating set for a graph $G=(V, E)$ is the task of identifying a minimum subset of vertices $\hat{V} \in V$ such that, for each vertex v not in the subset, there exists a vertex u in the subset such that an edge between the vertices v and u exists in the graph G, e.g., $$\forall v \notin \hat{V}, \exists u \in \hat{V} s.t. \{v,u\} \in E. \quad (6)$$

Let $N=|V|$ represent the number of vertices in the graph, let $V=\{v_i : i=0, \ldots, N-1\}$ and let $\mathcal{N}_i = \{v_j : (v_i, v_j) \in E, j=0, \ldots, N-1\}$ represent the set of vertices adjacent to vertex $v_i$. The task of determining the minimum dominating set for the graph can then be formulated as the following optimization problem:

$$\min_{x_i \in \{0,1\}} \sum_{i=0}^{N-1} x_i \quad (7)$$

$$w.r.t. \ x_i + \sum_{j: v_j \in \mathcal{N}_i} x_j \ge 1 \ \forall \ i, \quad (8)$$

where the variables $x_i$ take the value 1 if the vertex i is in the minimum dominating set and take the value 0 otherwise.

The inequality constraints given by Equation (8) can be mapped to the standard forms:

$$0 \le x_i + \sum_{j: v_j \in \mathcal{N}_i} x_j - 1 \le |\mathcal{N}_i| \ \forall \ i \quad (9)$$

in which the RHS of each Equation (9) is an upper bound. Therefore, the first inequality is constrained through introduction of $\lceil \log_2(|\mathcal{N}_i|+1) \rceil$ binary variables $b_{i,0}, \ldots, b_{i,\lceil \log_2(|\mathcal{N}_i|+1) \rceil-1} \in \{0, 1\}$ and replacement of the inequality constraint with the equality constraint:

$$x_i + \sum_{j: v_j \in \mathcal{N}_i} x_j - 1 = \sum_{k=0}^{\lceil \log_2(|\mathcal{N}_i|+1) \rceil - 1} b_{i,k} 2^k \ \forall \ i \quad (10)$$

The equality constraints given by Equation (10) can be added to the objective function given by Equation (7) above to obtain a QUBO formulation of the task:

$$\min_{x_i \in \{0,1\}} \sum_{i=0}^{N-1} x_i + P \sum_{i=0}^{N-1} \left( 1 - x_i - \sum_{j: v_j \in \mathcal{N}_i} x_j + \sum_{k=0}^{\lceil \log_2(|\mathcal{N}_i|+1) \rceil - 1} b_{i,k} 2^k \right)^2 \quad (11)$$

where $P \gg 0$ represents a penalty constant.

Therefore, to obtain a minimum dominating set for the graph included in the topology of the communication network from the quantum computing resource, the system can generate a QUBO formulation of the task (according to Equation (11)) using the data representing the topology of the communication network. The system can then provide the generated QUBO formulation of the task to the quantum computing resource for processing. Alternatively, the system can provide the quantum computing resource with the data representing the topology of the communication network and data requesting that the quantum computing resource compute a minimum dominating set for the graph included in the topology. In these implementations the quantum computing resource can generate a QUBO formulation of the task (according to Equation (11)) using the data representing the topology of the communication network.

Minimum Vertex Cover

The task of determining a minimum vertex cover of a graph $G=(V,E)$ is the task of identifying a smallest set (or "cover") of vertices such that each edge in the graph G has at least one member of the set as an end point.

Let $N=|V|$ represent the number of vertices in the graph, let $V=\{v_i : i=0, \ldots, N-1\}$ and let each edge in E be expressed as a set of the two indices of its endpoints, e.g., $$E=\{\{i,j\}: \text{an edge exists between } v_i \text{ and } v_j\}. \quad (12)$$

The task of determining the minimum vertex cover for the graph can then be formulated as the following optimization problem $$\min_{x_i \in \{0,1\}} \sum_{i=0}^{N-1} x_i \quad (13)$$

$$w.r.t. \ x_i + x_j \ge 1 \ \forall \ \{i, j\} \in E, \quad (14)$$

where the variables $x_i$ take the value 1 if the vertex i is in the minimum vertex cover and take the value 0 otherwise.

The inequality constraints given by Equation (14) can be mapped to equality constraints by introducing binary variables $b_{i,j} \in \{0,1\}$ and replacing each inequality constraint with a respective equality constraint:

$$x_i + x_j = 1 + b_{i,j}. \tag{15}$$

The equality constraints given by Equation (15) can be added to the objective function given by Equation (13) above to obtain a QUBO formulation of the task:

$$\min_{x_i, b_{i,j} \in \{0,1\}} \sum_{i=0}^{N-1} x_i + P \sum_{\{i,j\} \in E} (x_i + x_j - b_{i,j} - 1)^2 \tag{16}$$

where P>>0 represents a penalty constant.

Therefore, to obtain a minimum vertex cover for the graph included in the topology of the communication network from the quantum computing resource, the system can generate a QUBO formulation of the task (according to Equation (16)) using the data representing the topology of the communication network. The system can then provide the generated QUBO formulation of the task to the quantum computing resource for processing. Alternatively, the system can provide the quantum computing resource with the data representing the topology of the communication network and data requesting that the quantum computing resource compute a minimum vertex cover for the graph included in the topology. In these implementations the quantum computing resource can generate a QUBO formulation of the task (according to Equation (16)) using the data representing the topology of the communication network.

The system can determine whether to instruct the quantum computing resource to determine a dominating set of vertices for the graph included in the network topology or a vertex cover for the graph included in the network topology based on the assumed failure-alarm model. For example, in implementations where the local failure-alarm model described above is assumed, the system can instruct the quantum computing resource to determine a dominating set of vertices for the graph. As another example, in implementations where a more demanding local failure-alarm model is assumed, e.g., a model whereby a failure on a connection between two network devices (in other words on an edge of the graph) can trigger alarms on the two network devices, the system can instruct the quantum computing resource to determine a vertex cover for the graph.

Figure 5:
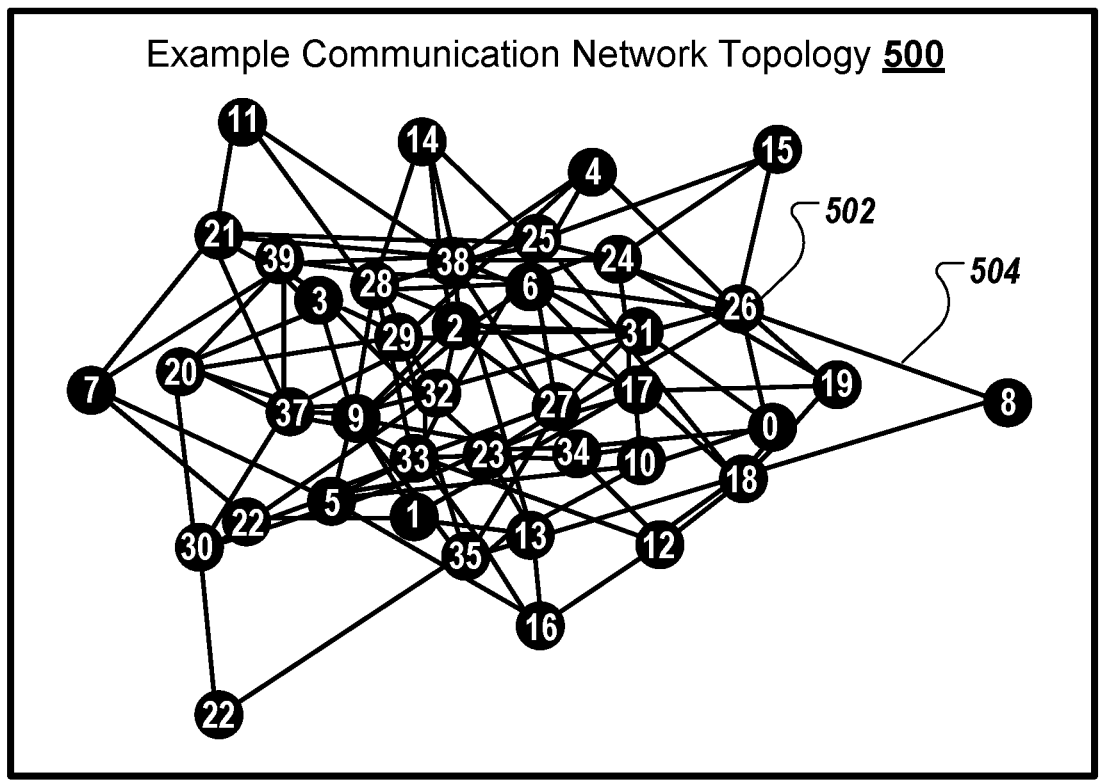
FIG. 5 shows an example communication network topology.

Returning to FIG. 2, the system receives, from the quantum computing resource, data representing a first subset of network devices in the communication network (step 204). The first subset of network devices includes network devices that represent a minimum dominating set of vertices for the graph included in the topology of the communication network or a minimum vertex cover for the graph included in the topology of the communication network (depending on which was requested by the system at step 202). An example minimum dominating set and minimum vertex cover for the communication network topology 500 of FIG. 5 are illustrated and described below with reference to FIG. 6.

The system monitors network devices in the first subset of network devices to generate alarm data representing triggered network device alarms (step 206). Under the local failure-alarm model, a failure on a network device in the first subset of network devices will trigger an alarm on the network device. However, a failure on a neighboring network device—which may or may not be included in the first subset of network devices—can also trigger an alarm on the network device.

Therefore, to generate the alarm data, the system can monitor the network devices in the first subset to identify one or more network devices in the first subset with triggered alarms. For each network device in the first subset with a triggered alarm, the system can identify neighboring network devices of the network device based on the topology of the communication network and the assumed local failure-alarm model. For example, the system can maintain a look-up table that stores an alarm-failure relationship for the communication network, e.g., where elements in the look-up table indicate whether an alarm at one network device can be caused by a failure of another network device (and vice versa). The system can query the look-up table to identify neighboring network devices of the network device. The neighboring network devices can include network devices included in the first subset or generally any network device in the communication network, e.g., network devices included in the complement of the first subset.

For each identified neighboring network device, the system can further determine whether the neighboring device is a candidate point of failure by determining, e.g., using the look-up table, whether alarms triggered by the neighboring device in the case of failure match the observed triggered alarms in the first subset. For example, suppose an alarm of a first network device included in the first subset is triggered and an alarm of a second network device included in the first subset is not triggered. Suppose the first network device is connected to a third and fourth network device, and the second network device is connected to the third network device. The alarm on the first network device could be caused by the first, third or fourth network device. However, if the third network device fails, an alarm would also be triggered on the second network device, which is not the case. Therefore, the candidate point of failures for the first network device include the first and fourth network devices.

The system can then generate a set of alarm data for the network device, where the set of alarm data includes 1) data identifying the network device and 2) data identifying neighboring network devices that are determined to be candidate points of failure. Accordingly, the generated alarm data can include multiple sets of alarm data, where each set corresponds to a triggered network device in the first subset of network devices and includes data identifying the triggered network device and data identifying other network devices in the communication network that could have caused the network device's alarm to be triggered, e.g., neighboring network devices under the local failure-alarm model. The union of the generated alarm data produces a set of network devices that are candidate points of failures, e.g., candidate root cause failures in the network.

The system provides the generated alarm data to a quantum computing resource and instructs the quantum computing resource to compute a solution to the root cause identification problem using the alarm data (step 208). Due to the structure of the local failure-alarm model and structure of the generated alarm data, the root cause identification problem can be formulated as a minimum set cover problem.

For example, let the communication network include N network devices represented by a collection of vertices $V=\{1, \ldots, N\}$. Let the network include a set of M alarms $A=\{1, \ldots, M\}$, in which under the local failure-alarm model the m-th alarm monitors a subset of network devices $V_m \subset V$. That is, a failure on any network device in the subset of network devices $V_m$ triggers the m-th alarm. The state of the m-th alarm can be represented by $a_m$ and can take the value 1 if the alarm is triggered or 0 otherwise. Under the local failure-alarm model, the state of the m-th alarm can therefore take the value 1 if there exists a failing network device in the subset of network devices that the alarm monitors and take the value 0 otherwise, e.g., $$a_m = \begin{cases} 1 & \text{if } \exists\, i \in V_m \text{ s.t. the } ith \text{ device fails} \\ 0, & \text{otherwise} \end{cases}$$

In addition, under the local failure-alarm model, a set of alarms $A_i$ is triggered when network device i fails, e.g., $A_i = \{m \in A: \text{alarm m is triggered if device i fails}\}$. The generated alarm data therefore takes the form $\hat{O} = \{m \in A: a_m = 1\}$.

Therefore, given alarm data generated by monitoring the network devices in the first subset of network devices, the task of computing a solution to the root cause identification problem using the alarm data is the task of computing a smallest set of root-cause failures that reproduces the alarm data. This task is equivalent to determining a minimum set cover of the alarms $A_i$ on V given $\hat{O}$, i.e., determining a smallest $\hat{V} \subset V$ such that $\hat{O} = U_{i \in \hat{V}} A_i$. The task of determining a minimum set cover is an NP-Hard problem, for which there are no known classical algorithms that can solve it efficiently asymptotically.

As described above, in some implementations the quantum computing resource may include a quantum computing resource, e.g., an annealer, that is configured to solve quadratic unconstrained binary optimization (QUBO) problems. Therefore, to instruct the quantum computing resource to determine a minimum set cover, the system can generate a QUBO formulation of the task and provide the quantum computing resource with data representing the generated QUBO formulation. Techniques for generating a QUBO formulation of the task of determining a minimum set cover of alarm data are described below.

Minimum Set Cover

Let $U = \{0, 1, \ldots, n-1\}$ represent a set of $n \in \mathbb{N}$ elements and let $S = \{V_i: i = 0, \ldots, N-1\}$ represent a collection of $N \in \mathbb{N}$ sets whose union is equal to U, i.e., $U_{i=0}^{N-1} V_i = U$. The task of determining the minimum set cover can be formulated as the following optimization problem $$\min_{x_i \in \{0,1\}} \sum_{i=0}^{N-1} x_i \tag{17}$$

$$\text{w.r.t.} \sum_{j: u \in V_j} x_j \geq 1 \ \forall\, u = 0, 1, \ldots, n-1, \tag{18}$$

where the variables $x_i$ take the value 1 if the set $V_i$ is in the minimum set cover and take the value 0 otherwise.

The inequality constraints given by Equation (16) can be expressed as $1 \leq \Sigma_{j: u \in V_j} x_j \leq N$, $\forall u$ and therefore can be expressed in standard form:

$$0 \leq \sum_{j: u \in V_j} x_j - 1 \leq N - 1, \forall\, u \tag{19}$$

in which the RHS of each Equation (19) is an upper bound. Therefore, the first inequality is constrained through introduction of $\lceil \log_2 N \rceil$ binary variables $b_{u,0}, \ldots, b_{u,\lceil \log_2 N\rceil-1} \in \{0, 1\}$ and replacement of the inequality constraint with the equality constraint:

$$\sum_{j: u \in V_j} x_j - 1 = \sum_{k=0}^{\lceil \log_2 N \rceil - 1} b_{u,k} 2^k \ \forall\, u \tag{20}$$

The equality constraints given by Equation (20) can be added to the objective function given by Equation (17) above to obtain a QUBO formulation of the task:

$$\min_{x_i \in \{0,1\}} \sum_{i=0}^{N-1} x_i + P \sum_{u=0}^{n-1} \left( 1 - \sum_{j: u \in V_j} x_j + \sum_{k=0}^{\lceil \log_2 N \rceil - 1} b_{u,k} 2^k \right)^2 \tag{21}$$

where $P \gg 0$ represents a penalty constant.

Therefore, to obtain a minimum set cover for the alarm data from the quantum computing resource, the system can generate a QUBO formulation of the task (according to Equation (21)) using the alarm data. The system can then provide the generated QUBO formulation of the task to the quantum computing resource for processing. Alternatively, the system can provide the quantum computing resource with the alarm data and data requesting that the quantum computing resource compute a minimum set cover for the alarm data. In these implementations the quantum computing resource can generate a QUBO formulation of the task (according to Equation (21)) using the alarm data.

Figure 6:
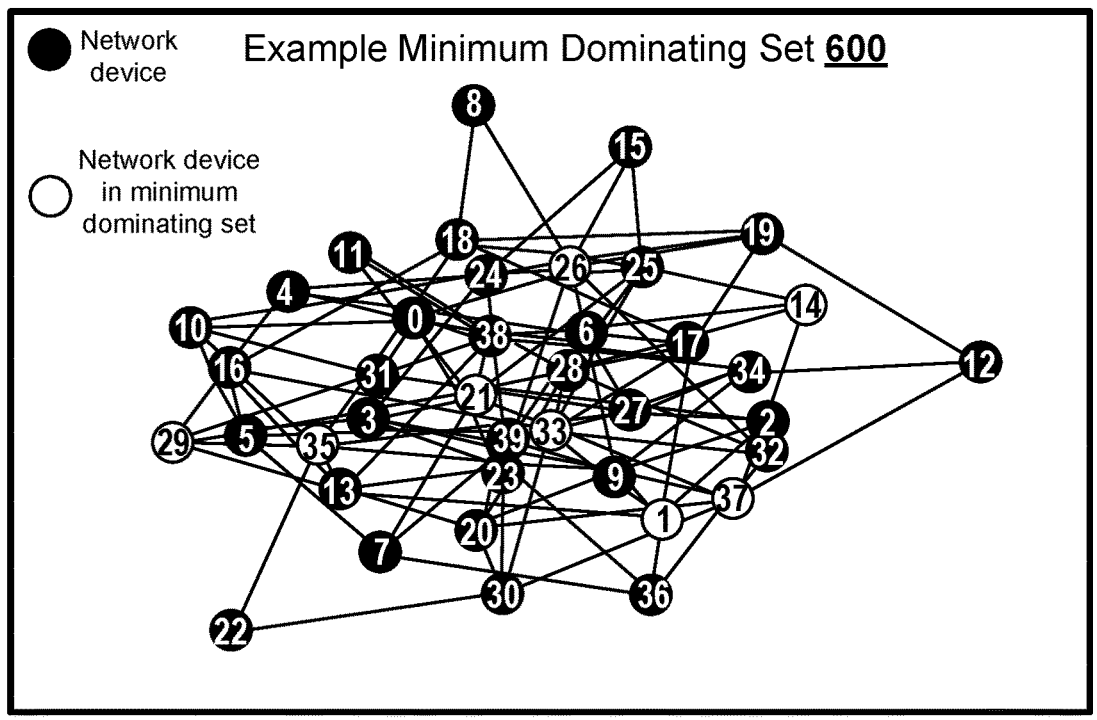
FIG. 6 shows an example minimum dominating set and an example minimum vertex cover for the example communication network topology shown in FIG. 5.
Figure 6:
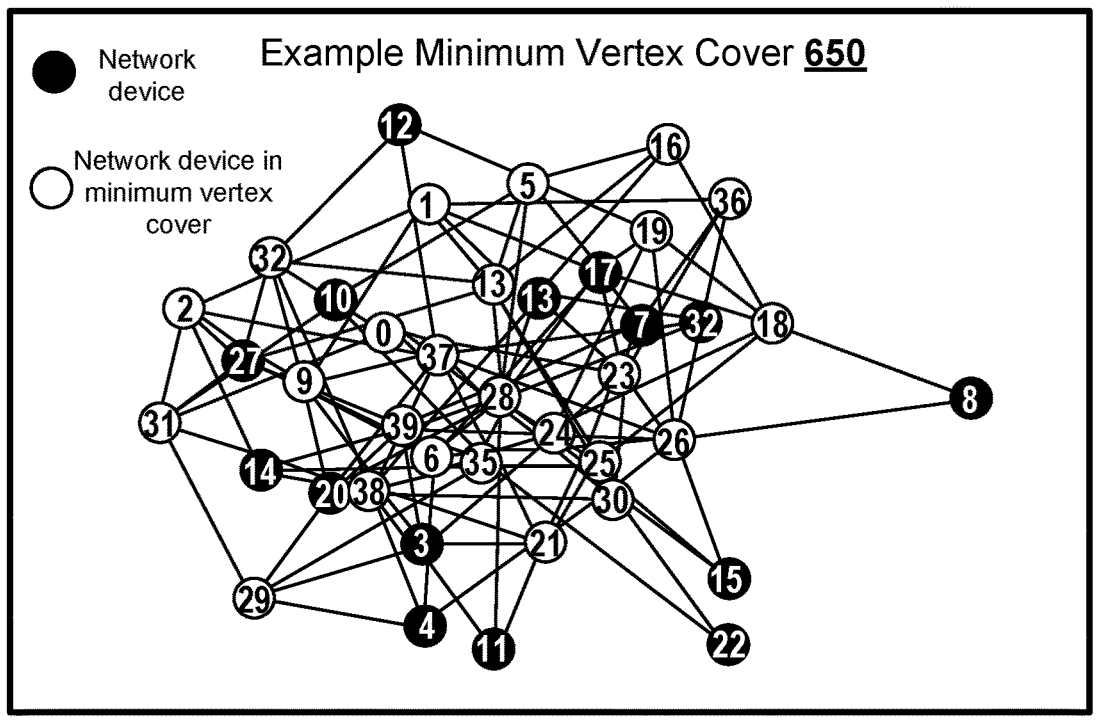

Returning to FIG. 2, the system receives data representing a second subset of network devices in the communication network (step 210). The second subset includes network devices that correspond to a minimum set cover for the alarm data, where sources of failures in the communication network are likely attributable to network devices in the second subset. An example minimum set cover for alarm data generated by monitoring the minimum vertex cover 650 of FIG. 6 is described below with reference to FIG. 8.

The system can investigate network devices in the second subset to identify root causes of failures in the communication network. When a root cause of a problem is identified, the system can determine corrective actions which, when implemented, address the identified root cause. For example, the system can determine that a particular network device suffered a system crash or unexpectedly shut down. In these implementations the system can cause the network device to restart. As another example, the system can determine that a particular network device failed due to environmental changes, a voltage fluctuation or an excess load. In these implementations the system can reduce the impact of such factors on network devices in the network by building in redundancy to prevent a single point of failure from disrupting large portions of the network or the whole network and maintaining a threshold value for each network element. As another example, the system can determine that a particular network device was misconfigured. In these implementations the system can perform checks, tests and validations, e.g., after a network change, to detect and correct misconfigurations.

In some implementations the techniques described above with reference to example process 200 of FIG. 2 can be applied separately. For example, in some implementations it may be advantageous to use the quantum computing resource to compute a minimum dominating set or minimum vertex cover only, and use a classical computer to compute the minimum set cover. In other implementations the process may not require computation of the minimum set cover. In some implementations it may be advantageous to use the quantum computing resource to compute the minimum set cover only, and use a classical computer to compute the minimum dominating set or minimum vertex cover. In other implementations the process may not require the computation of the minimum dominating set or minimum vertex cover. Two additional example processes for root cause analysis in a communication network are described below.

Figure 3:
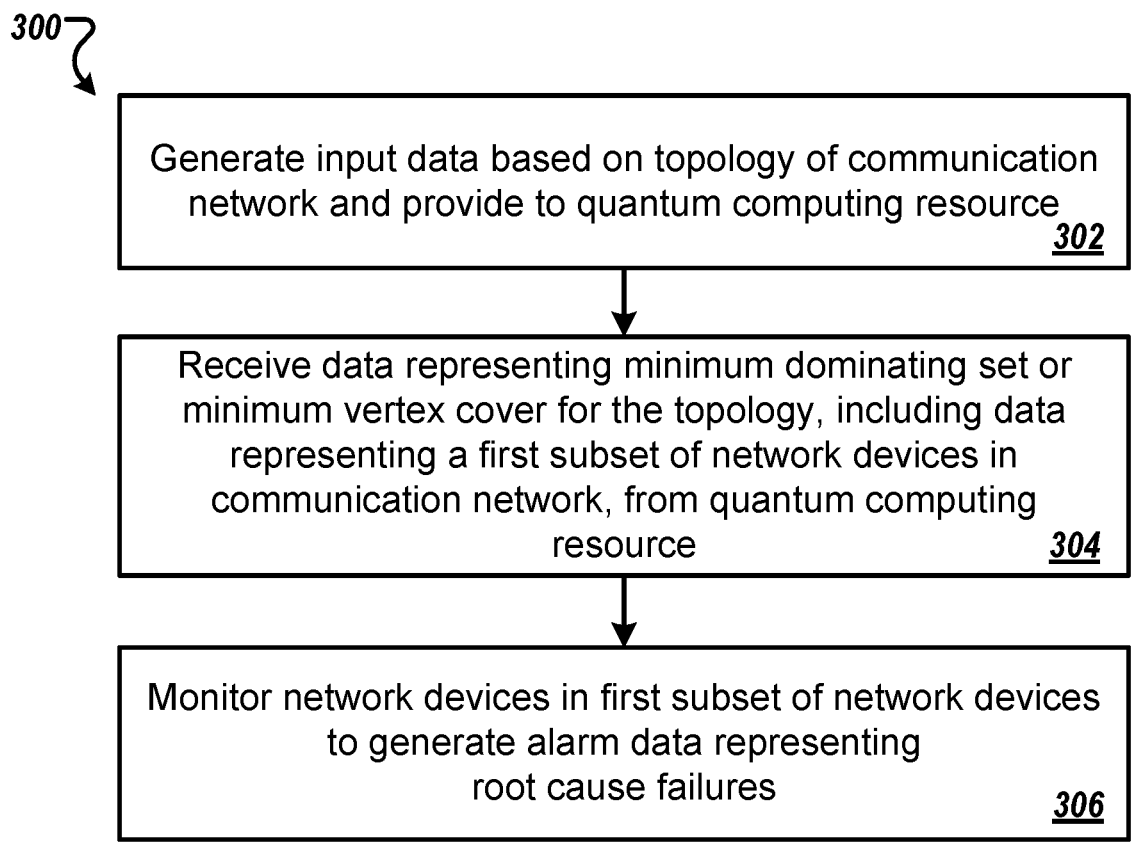

FIG. 3 is a flowchart of a second example process 300 for root cause analysis in a communication network. For convenience, the process 300 will be described as being performed by a system of one or more classical and quantum computers located in one or more locations. For example, example system 100 of FIG. 1, appropriately programmed in accordance with this specification, can perform the process 300.

The system provides a quantum computing resource with input data requesting determination of a minimum subset of network devices in the communication network to be monitored (step 302). Step 302 is similar to step 202 of example process 200 described above with reference to FIG. 2, and for brevity details are not repeated.

The system receives, from the quantum computing resource, data representing a first subset of network devices in the communication network. Step 304 is similar to step 204 of example process 200 described above with reference to FIG. 2, and for brevity details are not repeated.

The system monitors network devices in the first subset of network devices to generate alarm data representing triggered network device alarms (step 306). Step 306 can be similar to step 206 of example process 200 described above with reference to FIG. 2. For brevity details are not repeated.

In either case, the system can use the generated alarm data to determine root-cause failures in the network. For example, the system can compute a union of the alarm data to determine a subset of network devices, where network devices in the subset include diagnosed sources of failures in the communication network. The system can then investigate the network devices in the subset to identify root cause failures and determine corrective actions that address the root cause failures. Implementing example process 300 reduces the number of alarms that need to be monitored and therefore reduces root cause analysis resource requirements, e.g., compared to processes that require a whole network to be monitored, particularly when the monitoring is to be repeatedly performed over a long period of time. Example process 300 can be particularly beneficial for densely connected and large networks.

Figure 4:
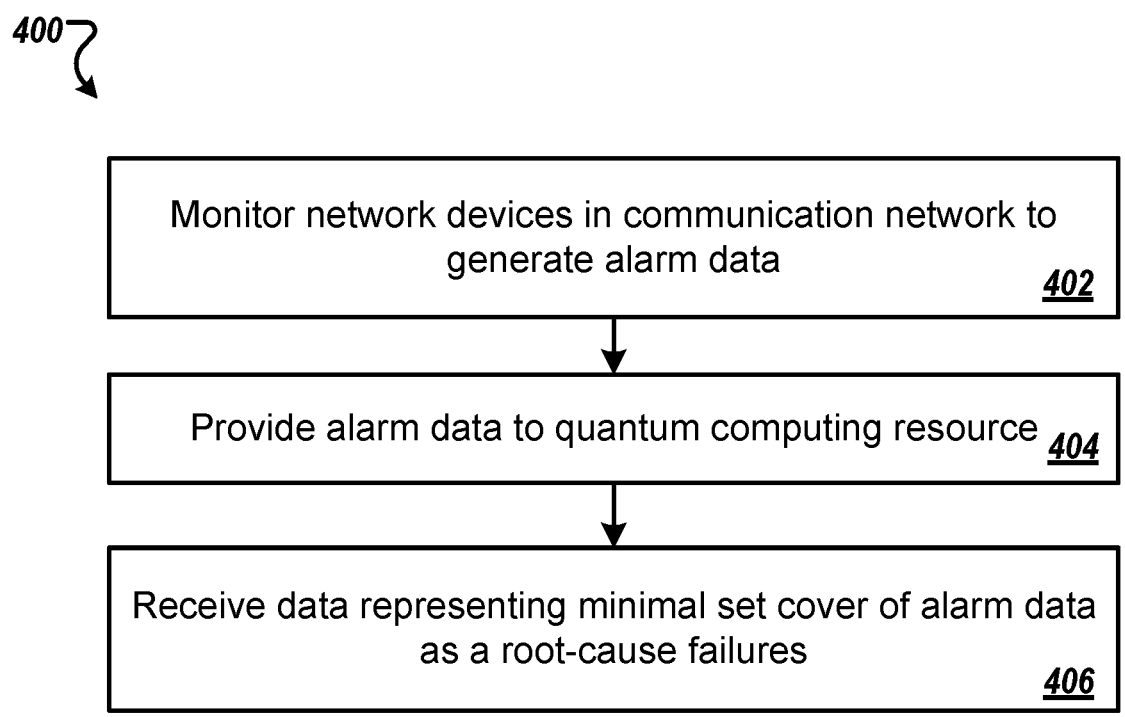

FIG. 4 is a flowchart of a fourth example process 400 for root cause analysis in a communication network. For convenience, the process 400 will be described as being performed by a system of one or more classical and quantum computers located in one or more locations. For example, example system 100 of FIG. 1, appropriately programmed in accordance with this specification, can perform the process 400.

The system monitors network devices in the communication network to generate alarm data representing triggered network device alarms (step 402). Step 402 is similar to step 206 of example process 200 described above with reference to FIG. 2, except all network devices are monitored instead of only a subset of network devices. For brevity details are not repeated.

The system provides the generated alarm data to a quantum computing resource and instructs the quantum computing resource to compute a solution to the root cause identification problem using the alarm data (step 404). Step 404 is similar to step 208 of example process 200 described above with reference to FIG. 2, and for brevity details are not repeated.

The system receives data representing a subset of network devices in the communication network from the quantum computing resource, where the subset includes a minimum set cover for the alarm data (step 406). Step 406 is similar to step 210 of example process 200 described above with reference to FIG. 2, and for brevity details are not repeated.

Example process 400 can be particularly beneficial for root cause analysis under more general failure-alarm models, e.g., exact failure-alarm models where an alarm is triggered when any device in a particular and fixed set of devices fails.

FIG. 5 shows an example communication network topology 500. The example communication network topology 500 is an illustrative example and for the sake of clarity represents a communication network with 40 network devices. However, in real-world applications the number of network devices can include a significantly larger number of devices, particularly in implementations where the communication network is a 5G network.

The example network topology 500 includes a graph of 40 vertices representing the 40 network devices, e.g., vertex 502 representing network device 26, and edges between vertices representing respective connections between network devices, e.g., edge 504 representing a connection between network devices 26 and 8. As described above with reference to step 202 of example process 200, under a local failure-alarm model it is assumed that a failure on one network device triggers an alarm on the network device itself and on other network devices within a local neighborhood of the network device, e.g., on other network devices directly connected to the network device or within a predetermined number of connections from the network device. For example, under a nearest-neighbor failure-alarm model, a failure on network device 22 triggers an alarm on network device 22 itself and on network devices directly connected to network device 22, e.g., network devices 30 and 35.

FIG. 6 shows an example minimum dominating set 600 and an example minimum vertex cover 650 for the communication network topology 500 of FIG. 5. The minimum dominating set 600 includes 8 vertices corresponding to network devices 1, 14, 21, 26, 29, 33, 35 and 37. That is, under the assumption of the local alarm-failure model, the system can monitor 8 out of the 40 network devices and still obtain alarm data that represents failures that can occur anywhere in the entire communication network. The minimum vertex cover 650 includes 25 vertices corresponding to network devices 0, 1, 2, 5, 6, 9, 16, 18, 19, 21, 23, 24, 25, 26, 28, 29, 30, 31, 33, 34, 35, 36, 37, 38, and 39. That is, under the assumption of the local alarm-failure model, the system can monitor 25 out of the 40 network devices and still obtain alarm data that represents failures that can occur anywhere in the entire communication network.

Figure 7:
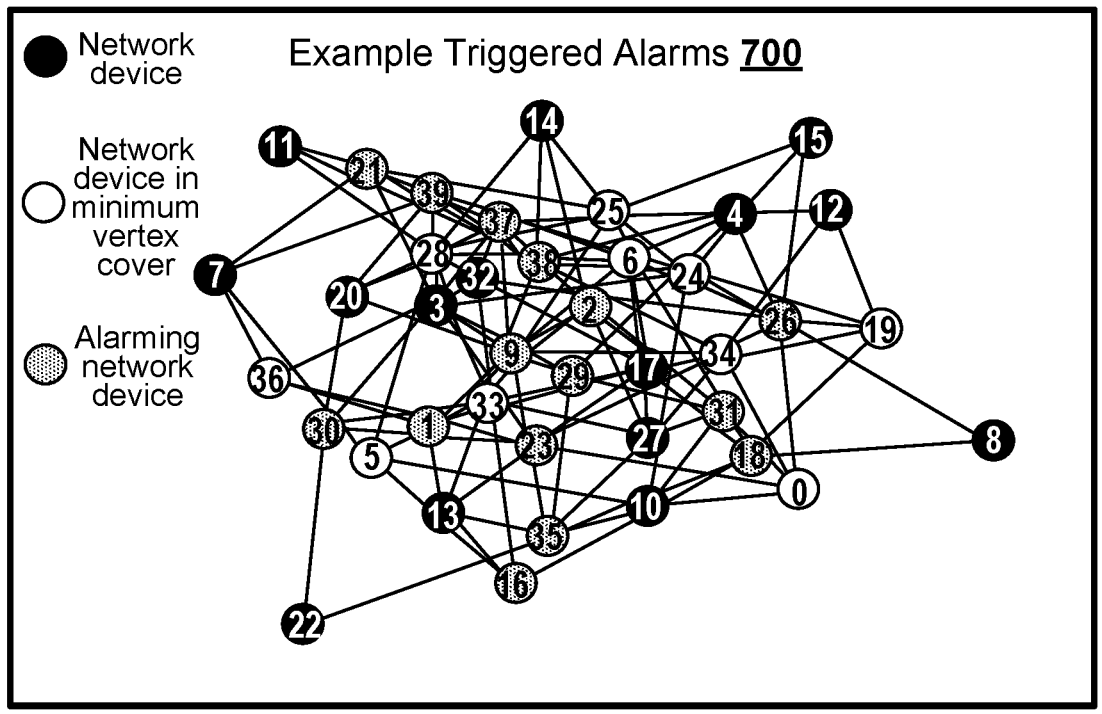
FIG. 7 shows example triggered alarms and candidate network device failures for the example minimum vertex cover shown in FIG. 6.
Figure 7:
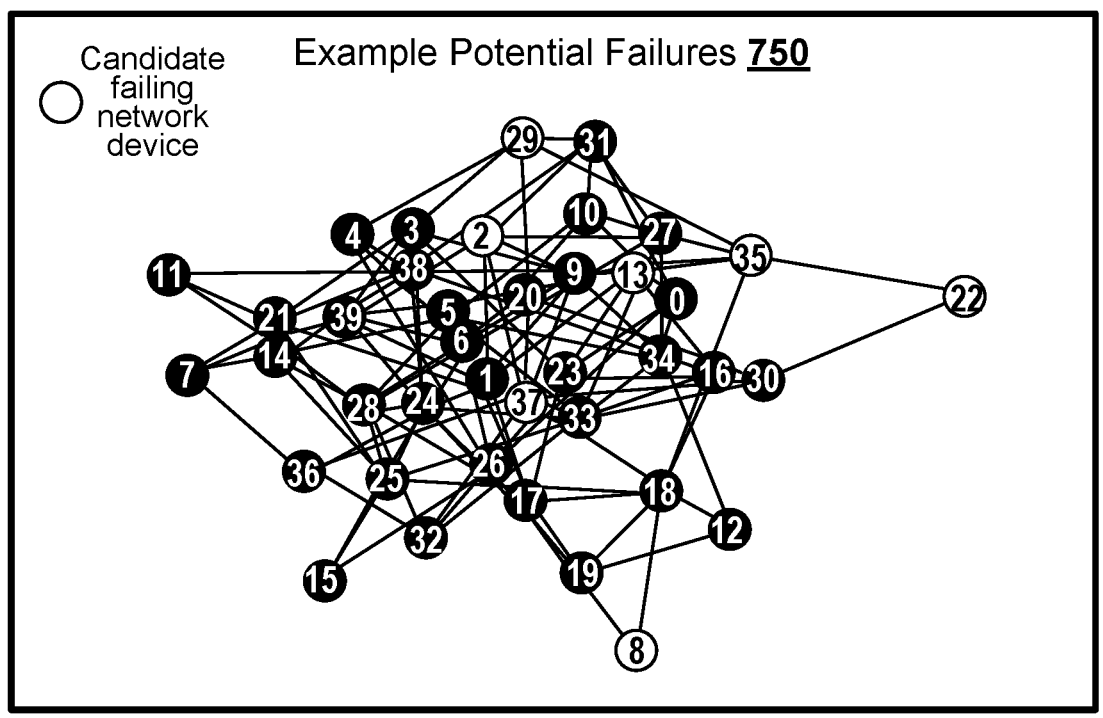

FIG. 7 shows example triggered alarms 700 and candidate network device failures 750 obtained after monitoring network devices in the example minimum vertex cover 650 shown in FIG. 6. The example triggered alarms 700 include 15 triggered alarms on network devices 1, 2, 9, 16, 18, 21, 23, 26, 29, 30, 31, 35, 37, 38 and 39. The candidate network device failures 750 can be computed using the techniques described above with reference to step 206 of example process 200 of FIG. 2, and includes network devices 2, 13, 22, 29, 35 and 37.

Figure 8:
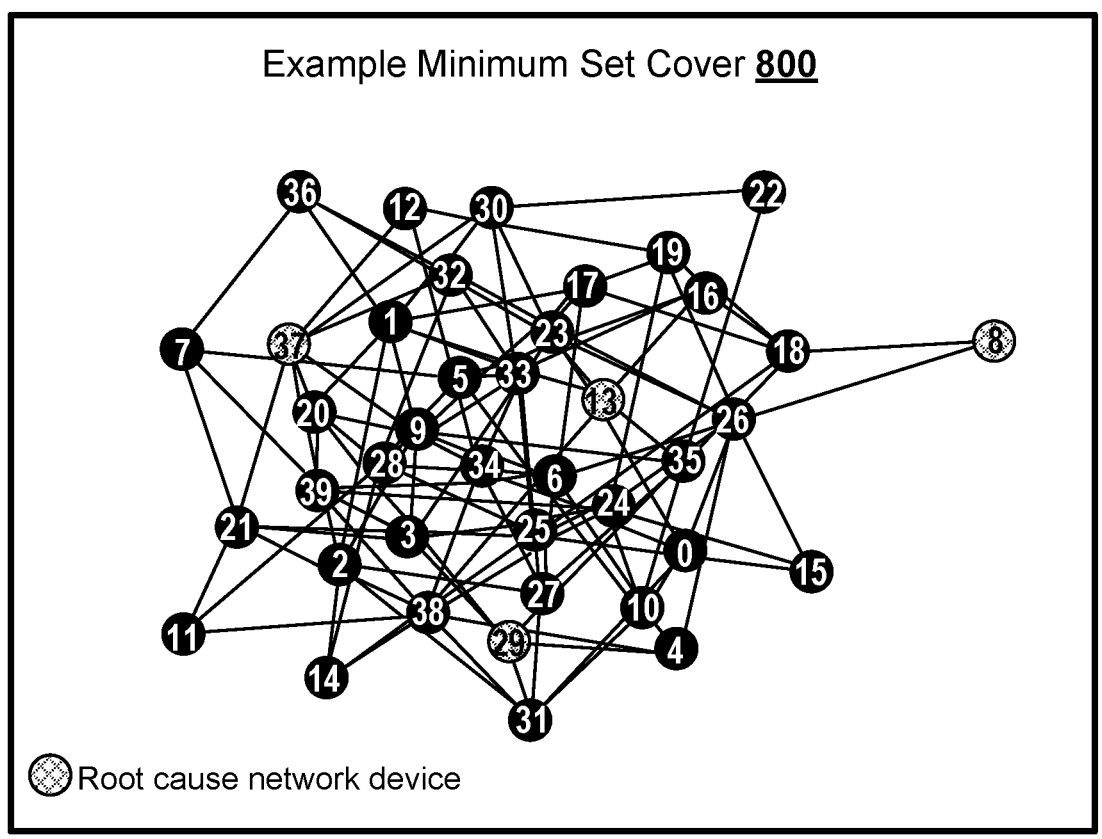
FIG. 8 shows an example minimum set cover for alarm data generated based on the example triggered alarms shown in FIG. 7.

FIG. 8 shows an example minimum set cover 800 for alarm data generated based on the example triggered alarms 700 of FIG. 7. The minimum set cover 800 includes 4 vertices corresponding to root cause failure network devices 8, 13, 29 and 37. FIG. 8 shows how monitoring a subset of network devices, e.g., in a minimum vertex cover, enables the identification root cause failures in the whole network, e.g., outside of the monitored subset. For example, network device 8 is identified as a root cause device however was not included in the minimum vertex cover and therefore not monitored.

Figure 9:
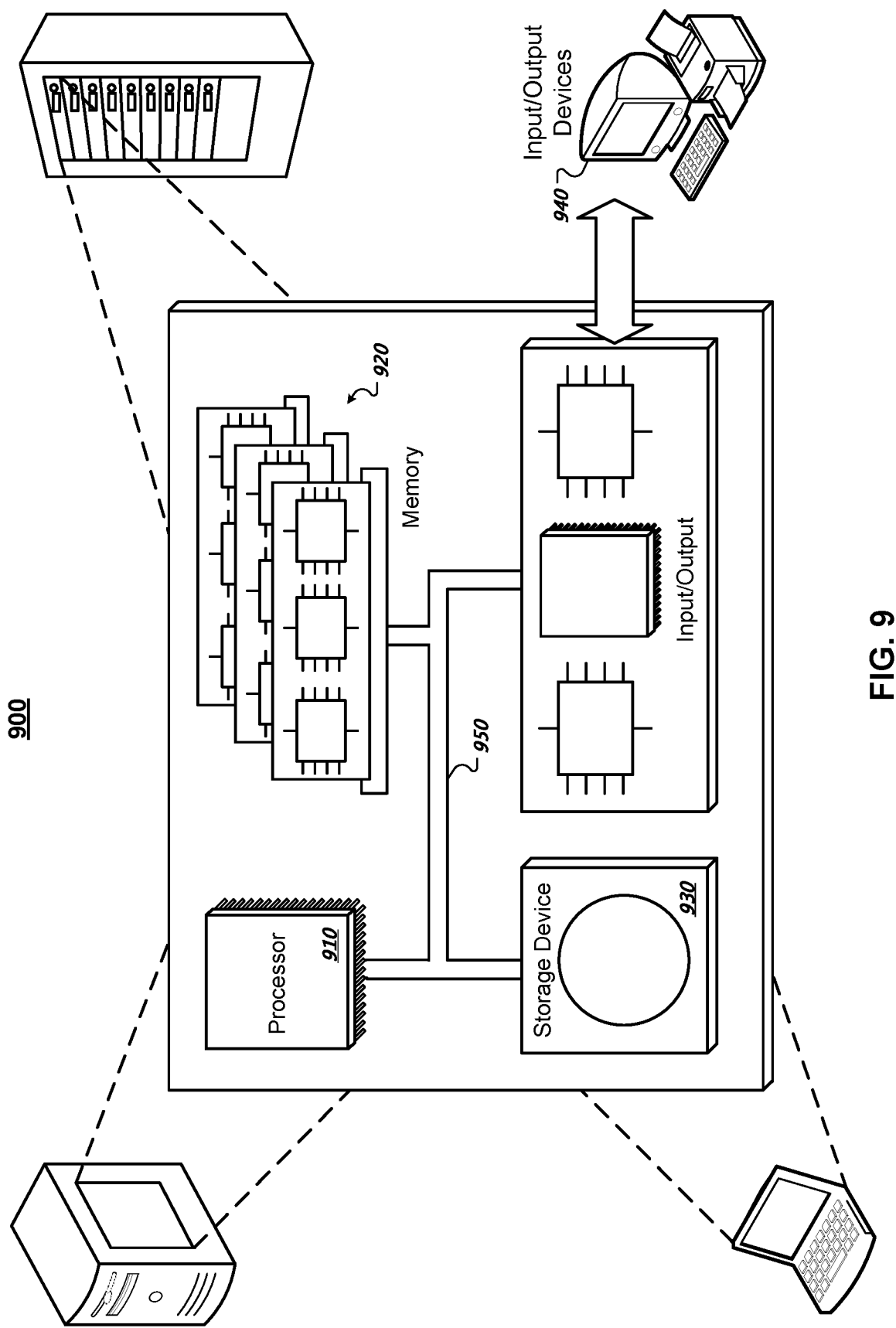
FIG. 9 shows an example classical processor that may be used to carry out the classical computing methods described herein.

FIG. 9 illustrates a schematic diagram of an exemplary generic classical processor system 900. The system 900 can be used for the classical operations described in this specification according to some implementations. The system 900 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 900 includes a processor 910, a memory 920, a storage device 930, and an input/output device 940. Each of the components 910, 920, 930, and 920 are interconnected using a system bus 950. The processor 910 may be enabled for processing instructions for execution within the system 900. In one implementation, the processor 910 is a single-threaded processor. In another implementation, the processor 910 is a multi-threaded processor. The processor 910 may be enabled for processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 may be enabled for providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for root cause analysis in a communication network, the method comprising:
generating, as input data, (i) data representing a topology of the communication network, the topology comprising a graph of vertices representing network devices and edges representing connections between the network devices, and (ii) a quadratic unconstrained binary optimization (QUBO) formulation of a task of determining a minimum dominating set of the vertices of the graph, wherein the QUBO formulation of the task of determining a minimum dominating set of vertices for the graph is given by $$\min_{x_i \in \{0,1\}} \sum_{i=0}^{N-1} x_i + P \sum_{i=0}^{N-1} \left( 1 - x_i - \sum_{j:v_j \in N_i} x_j + \sum_{k=0}^{\lceil \log_2(|N_i|+1) \rceil - 1} b_{i,k} 2^k \right)^2$$

where N represents the number of vertices in the graph, $N_i$ represents a set of vertices adjacent to vertex i, P represents a penalty constant, $x_i$ represent binary variables that take the value 1 if vertex i is in the minimum dominating set and take the value 0 otherwise, and $b_{i,k}$ represent binary variables;
providing a quantum computing resource with the input data comprising (i) the data representing the topology of the communication network and (ii) the input data comprising the QUBO formulation of the task of determining the minimum dominating set of the vertices of the graph;
receiving, from the quantum computing resource, data representing a first subset of network devices in the communication network, wherein the first subset comprises (i) the minimum dominating set of vertices for the graph or (ii) a vertex cover for the graph;
monitoring network devices in the first subset to generate alarm data representing triggered network device alarms; providing the alarm data to a quantum computing resource; and receiving, from the quantum computing resource, data representing a second subset of network devices in the communication network, wherein i) the second subset comprises a set cover for the alarm data and ii) the network devices in the second subset comprise diagnosed sources of failures in the communication network.

2. The method of claim 1, wherein the vertex cover comprises a minimum vertex cover.

3. The method of claim 1, wherein the set cover comprises a minimum set cover.

4. The method of claim 1, wherein the input data is generated based on a local failure-alarm model, wherein the local failure-alarm model assumes that a failure on a network device triggers an alarm on the network device and alarms on neighboring network devices.

5. The method of claim 4, wherein a respective alarm is fitted at each network device in the communication network.

6. The method of claim 1, wherein the input data further comprises a QUBO formulation of the task of determining the vertex cover for the graph.

7. The method of claim 1, wherein the QUBO formulation of the task of determining a minimum vertex cover is given by $$\min_{x_i, b_{i,j} \in \{0,1\}} \sum_{i=0}^{N-1} x_i + P \sum_{\{i,j\} \in E} (x_i + x_j - b_{i,j} - 1)^2$$

where N represents the number of vertices in the graph, E represents the set of edges in the graph, P represents a penalty constant, $x_i$ represent binary variables that the value 1 if vertex i is in the minimum dominating set and take the value 0 otherwise, and $b_{i,j}$ represents binary variables.

8. The method of claim 1, wherein the alarm data comprises multiple sets of alarm data, each set of alarm data comprising data identifying i) a network device in the first subset and ii) neighboring network devices in the communication network.

9. The method of claim 1, wherein monitoring network devices in the first subset to generate alarm data representing triggered network device alarms comprises: monitoring the network devices in the first subset to identify one or more network devices in the first subset with triggered alarms;
for each network device in the first subset with a triggered alarm:
identifying, based on the topology of the communication network, neighboring network devices of the network device that are candidate points of failure; and generating a set of alarm data for the network device, wherein the set of alarm data comprises data identifying the network device and the neighboring network devices.

10. The method of claim 9, wherein the neighboring network devices of the network device comprise network devices included in the first subset or included in the complement of the first subset.

11. The method of claim 1, wherein the method further comprises processing, by the quantum computing resource, the input data to compute i) the minimum dominating set of vertices for the graph or ii) the vertex cover for the graph.

12. The method of claim 1, wherein the method further comprises processing, by the quantum computing resource, the alarm data to compute the set cover of triggered alarms on network devices in the first subset of network devices.

13. The method of claim 1, wherein the communication network comprises a 5G network.

14. The method of claim 1, further comprising investigating the network devices in the second subset to identify root causes of failures in the communication network.

15. The method of claim 14, further comprising determining one or more corrective actions based on identified root causes of failures in the communication network.

16. The method of claim 1, wherein the quantum computing resource comprises a quantum annealer.

17. A system comprising: one or more computers; and one or more non-transitory computer-readable media coupled to the one or more computers having instructions stored thereon which, when executed by the one or more computers, cause the one or more computers to perform operations comprising: generating, as input data, (1) data representing a topology of a communication network, the topology comprising a graph of vertices representing network devices and edges representing connections between the network devices, and (11) a quadratic unconstrained binary optimization (QUBO) formulation of a task of determining a minimum dominating set of the vertices for the graph is given by $$\min_{x_i \in \{0,1\}} \sum_{i=0}^{N-1} x_i + P \sum_{u=0}^{n-1} \left( 1 - \sum_{j:u \in V_j} x_j + \sum_{k=0}^{\lceil \log_2 N \rceil - 1} b_{u,k} 2^k \right)^2$$

where N represents the number of vertices in the graph, $N_i$ represents a set of vertices adjacent to vertex i, P represents a penalty constant, $x_i$ represent binary variables that take the value 1 if vertex i is in the minimum dominating set and take the value 0 otherwise, and $b_{i,k}$ represent binary variables; providing a quantum computing resource with the input data comprising (i) the data representing the topology of the communication network and (ii) the input data comprising the QUBO formulation of the task of determining the minimum dominating set of the vertices of the graph; receiving, from the quantum computing resource, data representing a first subset of network devices in the communication network, wherein the first subset comprises i) the minimum dominating set of vertices for the graph or ii) a vertex cover for the graph; monitoring network devices in the first subset to generate alarm data representing triggered network device alarms; providing the alarm data to a quantum computing resource; and receiving, from the quantum computing resource, data representing a second subset of network devices in the communication network, wherein i) the second subset comprises a set cover for the alarm data and 11) the network devices in the second subset comprise diagnosed sources of failures in the communication network.

18. The system of claim 17, further comprising a quantum computing device in data communication with the one or more computers, wherein the quantum computing device is configured to perform operations comprising: processing, by the quantum computing resource, the input data to compute i) the minimum dominating set of vertices for the graph or ii) the vertex cover for the graph; and processing, by the quantum computing resource, the alarm data to compute the set cover for the alarm data.

19. A computer-implemented method for root cause analysis in a communication network, the method comprising: generating, as input data, (i) data representing a topology of the communication network, the topology comprising a graph of vertices representing network devices and edges representing connections between the network devices, and (ii) a quadratic unconstrained binary optimization (QUBO) formulation of a task of determining a minimum dominating set of the vertices of the graph, wherein the QUBO formulation of the task of determining a minimum dominating set of vertices for the graph is given by $$\min_{x_i \in \{0,1\}} \sum_{i=0}^{N-1} x_i + P \sum_{i=0}^{N-1} \left( 1 - x_i - \sum_{j:v_j \in N_i} x_j + \sum_{k=0}^{\lceil \log_2(|N_i|+1) \rceil - 1} b_{i,k} 2^k \right)^2$$

where N represents the number of vertices in the graph, $N_i$ represents a set of vertices adjacent to vertex i, P represents a penalty constant, $x_i$ represent binary variables that take the value 1 if vertex i is in the minimum dominating set and take the value 0 otherwise, and $b_{i,k}$ represent binary variables. binary variables; providing a quantum computing resource with the input data comprising (i) the data representing the topology of the communication network and (ii) the input data comprising the QUBO formulation of the task of determining the minimum dominating set of the vertices of the graph; receiving, from the quantum computing resource, data representing a first subset of network devices in the communication network, wherein the first subset comprises (i) the minimum dominating set of vertices for the graph or (ii) a vertex cover for the graph; monitoring network devices in the first subset to generate alarm data representing triggered network device alarms; determining, based on the alarm data, root-cause failures in the communication network.

20. A system comprising: one or more computers; and one or more non-transitory computer-readable media coupled to the one or more computers having instructions stored thereon which, when executed by the one or more computers, cause the one or more computers to perform operations comprising: generating, as input data, (i) data representing a topology of the communication network, the topology comprising a graph of vertices representing network devices and edges representing connections between the network devices, and (ii) a quadratic unconstrained binary optimization (QUBO) formulation of a task of determining a minimum dominating set of the vertices of the graph, wherein the QUBO formulation of the task of determining a minimum dominating set of vertices for the graph is given by $$\min_{x_i \in \{0,1\}} \sum_{i=0}^{N-1} x_i + P \sum_{i=0}^{N-1} \left( 1 - x_i - \sum_{j:v_j \in N_i} x_j + \sum_{k=0}^{\lceil \log_2(|N_i|+1) \rceil - 1} b_{i,k} 2^k \right)^2$$

where N represents the number of vertices in the graph, $N_i$ represents a set of vertices adjacent to vertex i, P represents a penalty constant, $x_i$ represent binary variables that take the value 1 if vertex i is in the minimum dominating set and take the value 0 otherwise, and $b_{i,k}$ represent binary variables; providing a quantum computing resource with the input data comprising (i) the data representing the topology of the communication network and (ii) the input data comprising the QUBO formulation of the task of determining the minimum dominating set of the vertices of the graph; receiving, from the quantum computing resource, data representing a first subset of network devices in the communication network, wherein the first subset comprises i) the minimum dominating set of vertices for the graph or ii) a vertex cover for the graph; monitoring network devices in the first subset to generate alarm data representing triggered network device alarms; and determining, based on the alarm data, root-cause failures in the communication network.

* * * * *

UNITED STATES PATENT AND TRADEMARK OFFICE
CERTIFICATE OF CORRECTION

PATENT NO. : 11,695,618 B2  
APPLICATION NO. : 17/143644  
DATED : July 4, 2023  
INVENTOR(S) : Sanjay Tiwari et al.

Page 1 of 1

It is certified that error appears in the above-identified patent and that said Letters Patent is hereby corrected as shown below:

In the Claims

In Claim 17, Column 22, Line 63, delete "(1)" and insert -- (i) --.

In Claim 17, Column 22, Line 67, delete "(11)" and insert -- (ii) --.

In Claim 17, Column 23, Lines 5-10, delete

"$\min_{x_i \in \{0,1\}} \sum_{i=0}^{N-1} x_i + P \sum_{u=0}^{n-1} \left( 1 - \sum_{j: u \in V_j} x_j + \sum_{k=0}^{\lceil \log_2 N \rceil - 1} b_{u,k} 2^k \right)^2$ " and insert -- $\min_{x_i \in \{0,1\}} \sum_{i=0}^{N-1} x_i + P \sum_{i=0}^{N-1} \left( 1 - x_i - \sum_{j: v_j \in \mathcal{N}_i} x_j + \sum_{k=0}^{\lceil \log_2 (|\mathcal{N}_i|+1) \rceil - 1} b_{i,k} 2^k \right)^2$ --.

In Claim 17, Column 23, Line 33, delete "11)" and insert -- ii) --.

In Claim 19, Column 24, Line 6, delete "binary variables. binary variables;" and insert -- binary variables; --.

Signed and Sealed this  
Twenty-second Day of August, 2023

Katherine Kelly Vidal  
*Director of the United States Patent and Trademark Office*